Dec. 11, 1951  N. P. MILLAR  2,578,441
EXPANDED SCALE VOLTMETER
Filed Jan. 20, 1950

Inventor:
Norval P. Millar,
by Russell A. Warner
His Attorney.

Patented Dec. 11, 1951

2,578,441

UNITED STATES PATENT OFFICE 2,578,441

EXPANDED SCALE VOLTMETER

Norval P. Millar, Danvers, Mass., assignor to General Electric Company, a corporation of New York Application January 20, 1950, Serial No. 139,695

3 Claims. (Cl. 171—95)

My invention relates to expanded scale voltmeters, and its object is to provide an expanded scale alternating current voltmeter of high accuracy when used on circuits in which the frequency may vary appreciably.

In carrying my invention into effect, I employ a measuring instrument of the electrodynamic type in which both the field and moving coil are energized from the alternating voltage to be measured. In one of these circuits I employ a nonlinear impedance such, for example, as a saturable core reactor which has the effect of increasing the energizing current of such circuit over the voltage range where scale expansion is desired. In the other circuit of the instrument I provide a frequency error compensating network. The current in this circuit also increases with the voltage which independently of frequency changes also aids the expansion characteristics of the instrument over the voltage range where scale expansion is desired.

Figure 1:
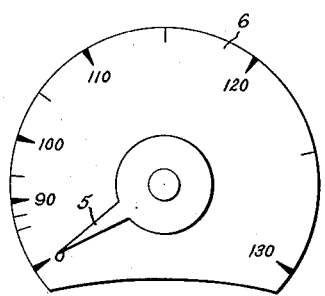
Figure 2:
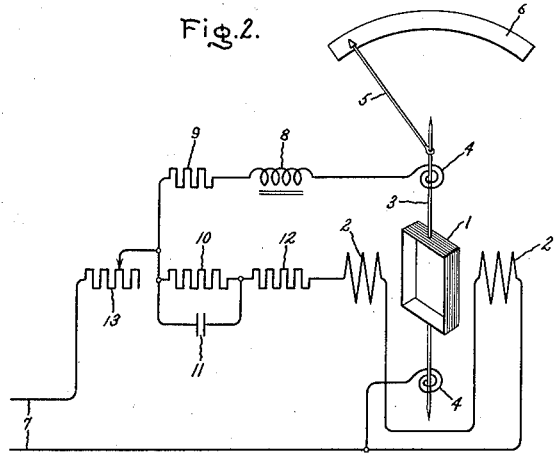
Figure 3:
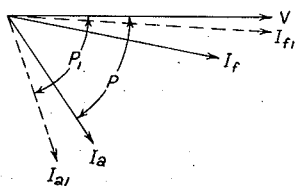
Figure 4:
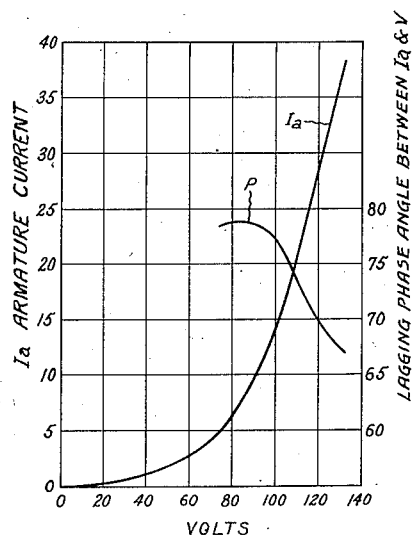

The features of my invention which are believed to be novel and patentable will be pointed out in the claims appended hereto. For a better understanding of my invention reference is made in the following description to the accompanying drawing in which Fig. 1 represents a face view of one of my expanded scale voltmeters showing where scale expansion is obtained over the range from 110 to 130 volts. Fig. 2 represents a circuit diagram of my expanded scale voltmeter. Fig. 3 is a vector diagram illustrative of the current and phase angle relations existing in my voltmeter circuits, and Fig. 4 shows curves of the current and its phase angle in the voltmeter circuit containing the saturable core reactor.

My invention will be explained as for use on a system where normal voltage as read on the voltmeter is assumed to be 120 volts, and where it is desirable to expand the scale in the vicinity of normal voltage as from 110 to 130 volts so that voltage variations in such vicinity may be read with great accuracy. In Fig. 2 there is represented a circuit diagram of my improved expanded scale voltmeter. The instrument itself is of the dynamometer type having a moving coil 1 in a stationary field winding 2. The moving system is pivoted on a shaft 3 having lead-in spirals 4 which furnish a zero restoring torque and a pointer 5 which indicates on the stationary expanded scale 6. A standard alternating current wattmeter structure may be used for this instrument.

The armature and field winding circuits are energized in parallel from the voltage to be measured represented at 7 and here assumed to have a normal voltage of 120 and a normal frequency of 60 cycles, both subject to variation. One of the parallel circuits, preferably the armature circuit, contains an iron core saturable reactor 8 and, if necessary, a current limiting resistance 9. The other circuit contains a frequency compensating network consisting of parallel connected resistance 10 and a condenser 11. This circuit may also contain a current limiting resistance 12. The resistances represented at 9 and 12 may be partially or completely included in the windings 1 and 2. An adjustable calibrating resistance 13 may be included in series with both circuits.

The saturable core reactor 8 is designed in relation to the current therethrough to approach saturation in the vicinity of normal voltage on the system, and hence, it is evident that the current in the armature circuit will increase much more rapidly than the voltage over the normal voltage range. As the reactor becomes saturated, the effective reactance in its circuit decreases and the phase angle between the armature current and line voltage decreases.

Both of these changes, namely, the nonlinear current in the armature circuit and its change in phase angle are utilized for scale expansion purposes. The nature of these changes is represented in Fig. 4. In Fig. 4 the abscissa represents line voltage from 0 to 140, and for the armature current curve $I_a$ the ordinates represent current, and for the phase angle curve P the ordinates represent the phase angle between armature current $I_a$ and line voltage. It is seen that the armature current curve is nonlinear and curves upward through the normal voltage range, and that its phase angle decreases over such range.

The current in the field circuit for any given frequency varies directly with the voltage, and its phase angle is constant. The relation of armature and field currents at normal voltage and frequency is shown in the vector diagram of Fig. 3 where vector V represents line voltage, $I_a$ armature current, and $I_f$ field current. If, now, the voltage increases, $I_f$ and $I_a$ both increase in length and the angle P decreases so that $I_a$ and $I_f$ become more nearly in phase. Hence, it is apparent that the linear increase in $I_f$, the nonlinear increase in $I_a$, and the decrease in P with an increase in line voltage over the normal voltage range, all contribute to the expansion characteristics over such range since the torque of the instrument is proportional to the vector sum or product of in-phase components of $I_a$ and $I_f$. The resulting expanded scale distribution is that shown in Fig. 1.

When the frequency changes and the voltage remains constant in the vicinity of normal voltage, the value and phase angle of $I_a$ and $I_f$ all change. Thus, with an increase in frequency $I_a$, Fig. 3, becomes $I_{a_1}$ decreasing in value and having a higher phase angle $P_1$ because the armature circuit is inductively reactive. For the same increase in frequency $I_f$ becomes $I_{f_1}$ increasing in value and decreasing its phase angle with respect to the line voltage V because of the greater current flow through the condenser 11. The constants of the circuits are so chosen that over the high accuracy normal voltage range of the instrument the increases in $I_{f_1}$ is just sufficient to offset the decrease in $I_{a_1}$, and the increase in phase angle between $I_{a_1}$ and $I_{f_1}$ so that the instrument torque and deflection do not change. It is not represented that such frequency compensation is fully effective for voltages and frequencies remote from normal. In practice it is possible to compensate the expanded scale voltmeter so that its frequency error is within ±¼ per cent of full scale per cycle from 105 to 130 volts and over a ±5-cycle variation from a reference frequency of 60 cycles. On circuits where the frequency does not vary the frequency compensation can be omitted.

In the manufacture of the parts of the apparatus, variations will occur which will influence the scale expansion. This is particularly true with respect to the reactor 8, because variations in the magnetic core or in the magnetic material used therein can change the point at which saturation will occur. The adjusting resistance 13 is extremely useful in correcting the scale distribution for such variations and for full scale adjustment. After the frequency compensation has been made satisfactory, resistance 13 may be adjusted to increase or decrease the current through the reactor circuit for a given voltage without noticeably affecting frequency compensation. Such adjustment with possible adjustment of the control springs 4 provides for full scale adjustment and at the same time can establish different points along the scale where a given degree of saturation in the reactor 8 will occur, and thus, the scale expansion range can be moved up or down along the scale as desired. After the desired scale distribution and full scale adjustment have been obtained and the scale calibrated, no further adjustment of 13 should be made. Hence, the adjustment of 13 may be considered as an initial factory calibration adjustment which is not to be changed by the user, and will thus ordinarily be made inaccessible for adjustment by the user.

This successful application of the saturating core reactor to a standard electrodynamic instrument mechanism results in an expanded scale alternating current voltmeter with improved accuracy and reliability. The circuit components represented in Fig. 2 are small and may be contained in the normal size instrument casing without difficulty. A natural zero has been maintained and the moving-coil system operates with a high torque gradient for all scale points in the expanded region.

A fast-responding moving system makes the device sensitive to small and rapid voltage fluctuations suitable for indicating, recording, or control purposes.

The invention has been described as for a 60-cycle, 130-volt full scale instrument with scale expansion primarily over the 110–130-volt range, and for this application of the invention I have successfully used circuit constants as follows:

Resistance of armature winding, 156 ohms
Total copper resistance of armature circuit, 982 ohms
A.-C. resistance of reactor 8 at 60 cycles and 120 volts, 1,250 ohms
Inductance of reactor 8 at 60 cycles and 120 volts, 10.6 henrys
Resistance 10, 16,700 ohms
Capacitance at 11, 0.5 mfd.
Resistance of remainder of field circuit, 870 ohms
Inductance of field winding 2, 13.0 henrys
Field current at 60 cycles, 120 volts, 0.050 amp.
Armature current at 60 cycles, 120 volts, 0.028 amp.

However, the invention is not limited in these respects since it will be apparent to those skilled in the art that the principles of the invention are generally applicable, and that the selection of circuit constants will depend upon the expanded scale results desired.

What I claim as new and desire to secure by Letters Patent of the United States, is:

1. An expanded scale alternating current voltmeter comprising a measuring instrument of the electrodynamic type having stationary field and moving coil energizing windings, circuits for energizing said windings in parallel from the voltage to be measured, an iron core saturable reactor included in one of said energizing circuits, a capacitance type of frequency compensating network included in the other of said energizing circuits, and an adjusting resistance included in series relation with said parallel circuits.

2. A natural zero expanded scale alternating current voltmeter comprising a measuring instrument of the electrodynamic type having stationary field and moving armature coil energizing windings, circuits for energizing said windings connected in parallel from the voltage to be measured, an iron core saturable reactor designed to become saturated over that range of voltage where scale expansion is desired in series with the armature circuit, and an adjusting resistance in series relation with said parallel circuits.

3. An expanded scale alternating current voltmeter comprising an electrical measuring instrument of the electrodynamic type having a stationary field winding and a moving coil armature winding, parallel circuits for energizing said windings from the voltage to be measured, an iron core saturable reactor included in series in the armature winding circuit designed to become saturated over the range of voltage where scale expansion is desired, a resistance and condenser connected in parallel and included in series in the field winding energizing circuit for compensating the voltmeter for variations in frequency over the expanded scale measurement range, and an adjusting resistance in series relation with said parallel circuits.

NORVAL P. MILLAR.

REFERENCES CITED

The following references are of record in the file of this patent:

UNITED STATES PATENTS

| Number | Name | Date |
| --- | --- | --- |
| 1,904,096 | St. Clair | Apr. 18, 1933 |
| 1,952,072 | Jewell | Mar. 27, 1934 |
| 2,205,228 | Smith | June 18, 1940 |